(12) United States Patent
Suzuki et al.

(10) Patent No.: US 12,432,061 B2
(45) Date of Patent: Sep. 30, 2025

(54) CONTENT PROTECTION SYSTEM

(71) Applicant: Hitachi Solutions, Ltd., Tokyo (JP)

(72) Inventors: Takayuki Suzuki, Tokyo (JP);
Hisayoshi Sato, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 225 days.

(21) Appl. No.: 17/961,053

(22) Filed: Oct. 6, 2022

(65) Prior Publication Data
US 2023/0283466 A1 Sep. 7, 2023

(30) Foreign Application Priority Data
Mar. 7, 2022 (JP) .................... 2022-034444

(51) Int. Cl.
*H04L 9/14* (2006.01)
*H04L 9/08* (2006.01)

(52) U.S. Cl.
CPC .................. *H04L 9/14* (2013.01); *H04L 9/08* (2013.01); *H04L 2209/60* (2013.01)

(58) Field of Classification Search
CPC . H04L 9/14; H04L 9/08; H04L 9/0825; H04L 9/0891; H04L 9/0894; H04L 9/3247; H04L 9/50; H04L 2209/60
See application file for complete search history.

(56) References Cited

U.S. PATENT DOCUMENTS

| | | | | |
|---|---|---|---|---|
| 10,417,219 B1 * | 9/2019 | Yang | ...................... | H04L 9/0643 |
| 10,636,102 B1 * | 4/2020 | Larimer | ............... | G06Q 20/384 |
| 11,646,869 B1 * | 5/2023 | Tamosiunas | ........... | H04L 9/0819 |
| | | | | 713/171 |
| 12,014,361 B2 * | 6/2024 | Suurkivi | ............... | G06Q 20/401 |
| 2018/0241551 A1 * | 8/2018 | Fujimura | ................ | G06F 21/10 |
| 2020/0042615 A1 * | 2/2020 | Boudville | .............. | G06F 16/182 |

(Continued)

FOREIGN PATENT DOCUMENTS

| CN | 111066046 A | * | 4/2020 | ......... G06F 16/2379 |
|---|---|---|---|---|
| CN | 116415955 A | * | 7/2023 | ......... G06Q 20/3825 |

(Continued)

OTHER PUBLICATIONS

Yu et al. English translation of CN 112543105 A. (Year: 2021).*

(Continued)

*Primary Examiner* — Sarah Su
(74) *Attorney, Agent, or Firm* — Volpe Koenig

(57) ABSTRACT

An connection apparatus receives a purchase desire notification including a public key from another connection apparatus via a blockchain network and transmits an encrypted content key acquired by encrypting a content key using the public key to the other connection apparatus via the blockchain network. The other connection apparatus transmits the purchase desire notification to the one connection apparatus and transmits transmission source information representing a transfer destination of the content to the blockchain network. In addition, the other connection apparatus decrypts the encrypted content key from the one connection apparatus using the stored secret key. In a case in which the encrypted content key is received, the blockchain network changes an owner represented in owner management information to the transfer destination.

13 Claims, 14 Drawing Sheets

(56) References Cited

U.S. PATENT DOCUMENTS

| | | | |
|---|---|---|---|
| 2021/0089677 A1* | 3/2021 | Qian | G06F 21/6227 |
| 2021/0119774 A1* | 4/2021 | Wei | G06F 9/45558 |
| 2021/0160227 A1* | 5/2021 | Li | H04L 63/0442 |
| 2022/0123925 A1* | 4/2022 | Lee | G06F 21/602 |
| 2022/0415329 A1* | 12/2022 | Park | G10L 15/26 |
| 2023/0252462 A1* | 8/2023 | Mo | G06Q 20/38215 |
| | | | 705/64 |
| 2023/0325473 A1* | 10/2023 | Buffard | G06F 21/1064 |
| | | | 713/155 |
| 2024/0007311 A1* | 1/2024 | Goenka | H04L 9/3239 |

FOREIGN PATENT DOCUMENTS

| | | | | | |
|---|---|---|---|---|---|
| CN | 116886664 | A | * | 10/2023 | |
| CN | 117579252 | A | * | 2/2024 | |
| JP | 2019049372 | A | | 3/2019 | |
| KR | 20230030916 | A | * | 3/2023 | G06Q 40/04 |
| SG | 10201900666 | R | * | 8/2019 | G06Q 20/38 |
| WO | WO-2019144042 | A2 | * | 7/2019 | H04L 9/0637 |
| WO | WO-2019144156 | A1 | * | 7/2019 | G06Q 20/0658 |
| WO | WO-2020036657 | A1 | * | 2/2020 | G06F 21/6245 |
| WO | WO-2022011003 | A1 | * | 1/2022 | H04L 63/0272 |
| WO | WO-2023164651 | A1 | * | 8/2023 | G06Q 20/06 |
| WO | WO-2023170194 | A1 | * | 9/2023 | G06F 21/10 |

OTHER PUBLICATIONS

Lv. English translation of CN 111066046 A. (Year: 2020).*
VWBL Protocol Developer Documents, "How Does VWBL Work?" (Available at: https://docs.vwbl-protocol.org/intro/intro_2.html) (2022).

* cited by examiner

FIG. 5

| 601 ID | 602 Owner | 603 Content checking hash value | 604 Reference destination information |
|---|---|---|---|
| 1 | | | |
| 2 | | | |
| 3 | | | |
| 100 | | | |

600 Owner management information

FIG. 7

| ID | Planned owner | Lock information | Authentication information | Encrypted content key |
|---|---|---|---|---|
| 1 | | | | |
| 2 | | | | |
| 3 | | | | |
| 100 | | | | |

801　802　803　804　805

800 Planned owner management information

FIG. 11

| ID | Owner | Content checking hash value | Reference destination information | Replacement key | Encrypted content key |
|---|---|---|---|---|---|
| 1 | | | | | |
| 2 | | | | | |
| 99 | | | | | |
| 100 | | | | | |

600A Owner management information

FIG. 13

| ID | Planned owner | Lock information | Authentication information | Assist information of planned owner | Replacement key of planned owner |
|---|---|---|---|---|---|
| 1 | | | | | |
| 2 | | | | | |
| 3 | | | | | |
| 100 | | | | | |

800A Planned owner management information

FIG. 14

| ID 601 | Owner 602 | Hash value of content 603 | Reference destination 604 | Public key of owner 607 | Replacement information-added content encryption key 608 |
|---|---|---|---|---|---|
| 1 | | | | | |
| 2 | | | | | |
| 3 | | | | | |
| 99 | | | | | |
| 100 | | | | | |

600B Owner management information

CONTENT PROTECTION SYSTEM

CROSS-REFERENCE TO PRIOR APPLICATION

This application relates to and claims the benefit of priority from Japanese Patent Application No. 2022-034444 filed on Mar. 7, 2022 the entire disclosure of which is incorporated herein by reference.

BACKGROUND

The present disclosure relates to a content protection system.

Technologies called blockchains capable of accumulating digital data, which is handled by information devices, in a distributed manner and in a format for which it is extremely difficult to alter have attracted attention. In blockchains, conventionally, although Fungible Tokens that are tokens representing monetary values called virtual currency such as Bitcoin have been used, in recent years, values other than monetary values such as Non-Fungible Tokens (NFT) have been represented. An upper limit value of the number of tokens issued on a blockchain can be configured by an issuer, and thus formal owners of such tokens can be easily identified. For this reason, scarcity can be given also to digital data, and thus blockchains have attracted attention also in the field of arts and the like.

However, it is not practical to register content with a large size such as moving image data and high-definition still image data on a blockchain from the aspect of use costs and the like. For this reason, content with a large size is stored in a place other than a blockchain, and an URL and the like representing a storage destination of data are registered in an NFT stored in the blockchain.

At present, many NFTs are used in a public blockchain, and thus anybody can refer to the NFTs. Thus, by referring to NFTs, anybody can access content stored in a place other than a blockchain, and accordingly, there is a problem in secrecy and safety of content.

Regarding the problems described above, a technology for mounting an authentication function for determining whether or not a user requesting access to content is an authorized user in a server managing content is disclosed in Japanese Patent Application Publication No. 2019-49372. According to this technology, in a case in which a user who has requested access is an authorized user, access to the content is permitted.

SUMMARY

However, in the technology disclosed in Japanese Patent Application Publication No. 2019-49372, a centralized system having a server used for managing content is employed, thus a manager operating the server is necessary, and there is a problem of incurring a high cost. In addition, since a blockchain was originally intended to operate in a distributed environment, and utilization of a distributed system using a P2P technology such as an IPFS (Interplanetary File System), and the like are widely used, a structure other than a centralized system in which management of content depends on a specific company is desirable.

An object of the present disclosure is to provide a content protection system capable of improving safety of content without using a centralized system.

According to one aspect of the present disclosure, there is provided a content protection system managing content that is encrypted in a form that is able to be decrypted using a content decryption key and is stored in a predetermined storage place, the content protection system including: a blockchain network configured using a plurality of computers; and a plurality of connection apparatuses configured to be coupled to the blockchain network, in which a first connection apparatus that is one of the plurality of connection apparatuses stores the content decryption key, receives a use request requesting use of the content and including a public key corresponding to a secret key managed by a second connection apparatus from the second connection apparatus that is the connection apparatus other than the first connection apparatus via the blockchain network, and transmits an encrypted content decryption key acquired by encrypting the content decryption key using the public key included in the use request to the second connection apparatus via the blockchain network, the second connection apparatus stores the secret key, transmits the use request to the first connection apparatus via the blockchain network, transmits user information representing a use right grantee to whom a right to use the content is granted to the blockchain network, receives the encrypted content decryption key from the first connection apparatus via the blockchain network, and decrypts the encrypted content decryption key using the secret key to acquire the content decryption key, and the blockchain network stores user management information representing usable persons who are able to use the content and changes the users represented by the user management information to the use right grantee represented in the user information in a case in which the encrypted content decryption key is received.

According to the present invention, the safety of content can be improved without using a centralized system.

BRIEF DESCRIPTION OF THE DRAWINGS

FIG. 5 is a diagram illustrating an example of owner management information;

FIG. 7 is a diagram illustrating an example of planned owner management information;

FIG. 11 is a diagram illustrating another example of owner management information;

FIG. 13 is a diagram illustrating another example of planned owner management information; and FIG. 14 is a diagram illustrating another example of planned owner management information.

DETAILED DESCRIPTION OF THE EMBODIMENT

Hereinafter, embodiments of the present disclosure will be described with reference to the drawings. The present disclosure includes a technology enabling a user having a right to use content to determine access/non-access to the content managed in a blockchain.

Figure 1:
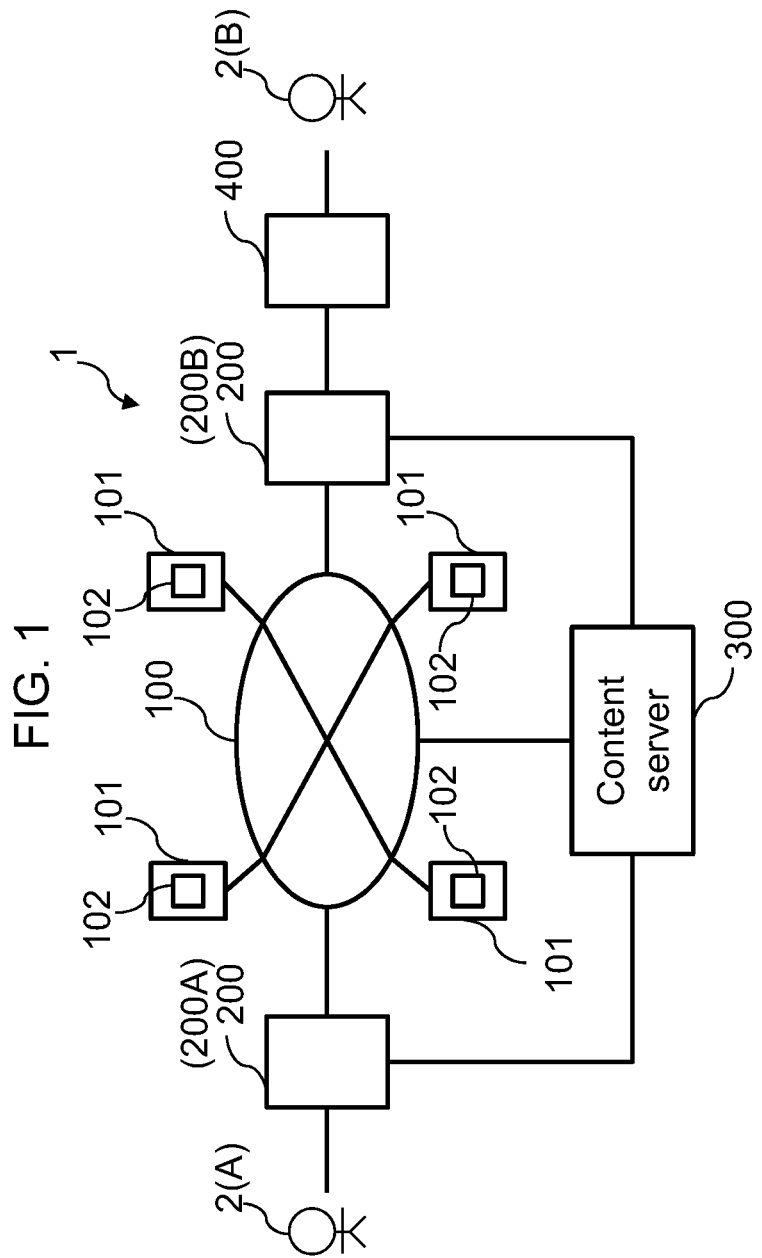
FIG. 1 is a diagram illustrating an entire configuration of a content protection system according to an embodiment of the present disclosure.

FIG. 1 is a diagram illustrating an entire configuration of a content protection system according to an embodiment of the present disclosure. The content protection system 1 illustrated in FIG. 1 is a system that manages the content and includes a blockchain network 100 that is composed of a plurality of nodes 101, a blockchain network connection apparatus 200 and a content server 300 that are coupled to the blockchain network 100, and a connection terminal 400 that is coupled to the blockchain network connection apparatus 200. The blockchain network 100 and the blockchain network connection apparatus 200 configure a blockchain system. The node 101 is a computer system such as a server. For example, the connection terminal 400 is a PC, a smartphone, or the like.

A user 2 using the content protection system 1 uses the blockchain network 100 through the blockchain network connection apparatus 200. The user 2 may directly use his or her blockchain network connection apparatus 200 or may use the blockchain network connection apparatus 200 provided by a connection service provider such as a company through his or her connection terminal 400. In a case in which his or her blockchain network connection apparatus 200 is directly used, by installing a predetermined program in a terminal device such as his or her PC or smartphone, the user 2 uses the terminal device as the blockchain network connection apparatus 200. The blockchain network connection apparatus 200 of the connection service provider is constructed using one or more servers and provides a connection service for the blockchain network 100 for the user 2.

In response to a request from the blockchain network connection apparatus 200, NFTs that are tokens that become transaction targets between users 2 are issued and traded in the blockchain network 100. In this embodiment, an NFT is issued in association with image data (still image data and moving image data) or a piece of content such as an item used for a game. The content associated with an NFT is not embedded in the NFT but is stored in the content server 300 that is an external storage apparatus. Since an NFT is associated with a content, a transaction target may be configured as a content.

Figure 2:
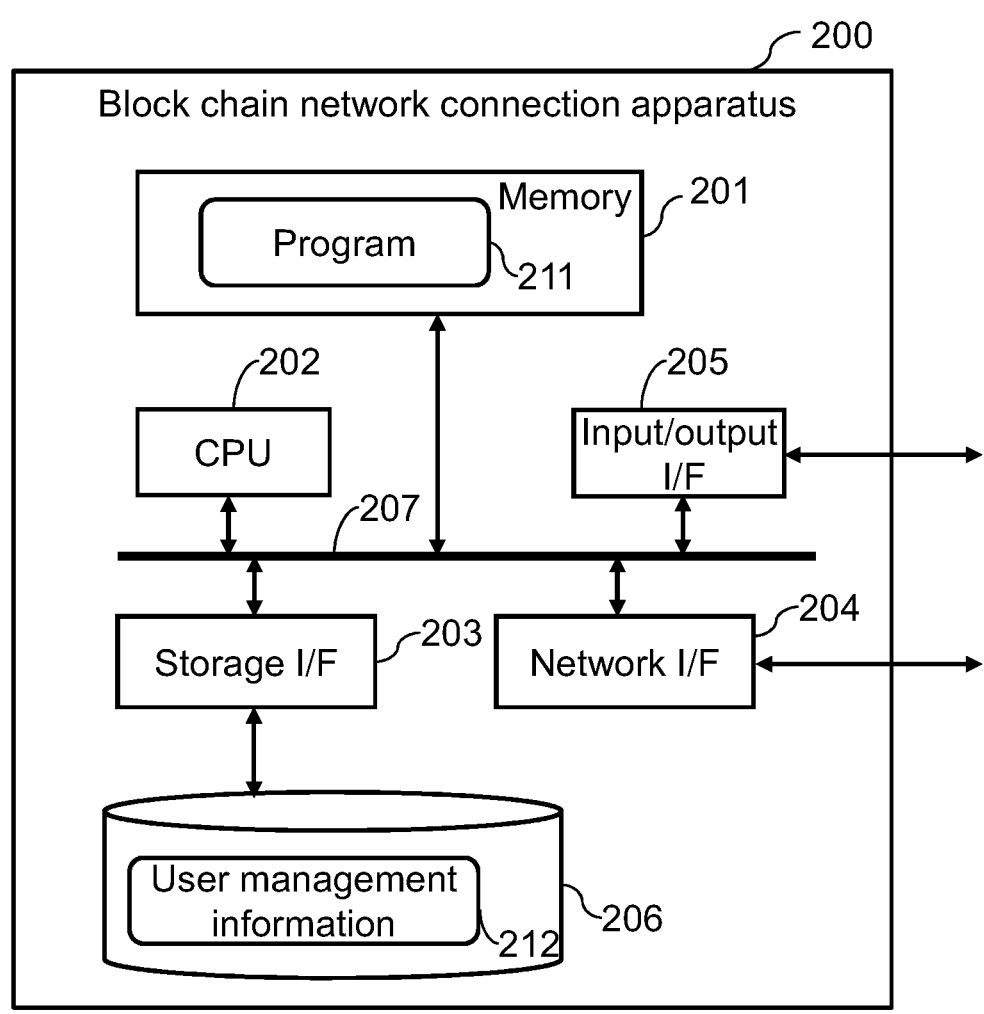
FIG. 2 is a diagram illustrating a configuration example of a blockchain network connection apparatus.

FIG. 2 is a diagram illustrating a configuration example of the blockchain network connection apparatus 200. As illustrated in FIG. 2, the blockchain network connection apparatus 200 includes a memory 201, a CPU 202, a storage interface 203, a network interface 204, an input/output interface 205, and an auxiliary storage apparatus 206, and these units are interconnected through a bus 207. In FIG. 2, an interface is represented as I/F.

The memory 201 stores a program 211 that defines operations of the CPU 202. In addition, the memory 201 stores various kinds of information (not illustrated) that is used or generated by the program.

The CPU 202 is a processor realizing various functional units by reading a program 211 that is a computer program stored in the memory 201 and executing the reading program 211. In this embodiment, the CPU 202 realizes a cryptographic processing unit 500 (see FIG. 3) that executes cryptographic processing that is necessary in a case in which the blockchain network 100 is requested to perform processing.

The storage interface 203 connects the bus 207 and the auxiliary storage apparatus 206 to each other. The input/output interface 205 is coupled to an external device (not illustrated) such as a display/operation device including a monitor, a keyboard, and the like. The network interface 204 is coupled to external devices such as the node 101 and the content server 300 through the blockchain network 100 or any other network.

The auxiliary storage apparatus 206 is an SSD (Solid State Drive), an HDD (Hard Disk Drive), or the like and stores various kinds of information. For example, the auxiliary storage apparatus 206 stores user management information 212 that manages key information used for cryptographic processing and user information relating to a user in association with each other. Since the auxiliary storage apparatus 206 can be easily detachable in most cases, the user management information 212 is preferably stored while being encrypted.

In addition, in the CPU 202 and the like, a tamper-resistant area that is an area having a tamper-resistant property may be included. In such a case, storage of the user management information 301 and a process performed by the cryptographic processing unit 500 may be performed inside the tamper-resistant area. Similarly, a tamper-resistant device that is an external device having a tamper-resistant property such as a hardware wallet may be used. In such a case, for example, the tamper-resistant device is coupled through the storage interface 203, the network interface 204, or the input/output interface 205 and performs storage of the user management information 301 and the process performed by the cryptographic processing unit 500.

Figure 3:
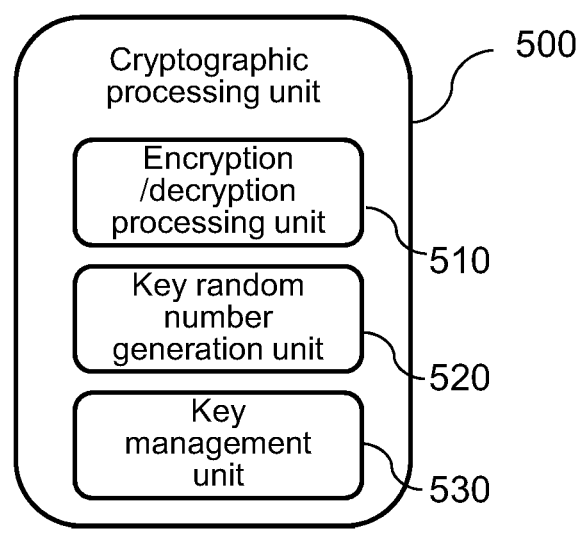
FIG. 3 is a diagram illustrating a configuration example of a cryptographic processing unit.

FIG. 3 is a diagram illustrating a configuration of the cryptographic processing unit 500. The cryptographic processing unit 500 illustrated in FIG. 3 includes an encryption/decryption processing unit 510, a key random number generation unit 520, and a key management unit 530. The encryption/decryption processing unit 510 performs an encryption process and a description process of various kinds of information. The key random number generation unit 520 generates key information (a public key encryption, a common key encryption, and the like) and a random number used in cryptographic processing. The key management unit 530 manages the key information and the random number generated by the key random number generation unit 520.

Each of the node 101 and the connection terminal 400 has a configuration similar to the blockchain network connection apparatus 200. The program 211 stored in the memory 201 of the node 101 is a smart contract 102 causing the CPU 202 to execute a process of performing issuance and registration management of NFTs. Generally, the process performed by the smart contract 102 is performed by a plurality of nodes 101 in cooperation. Information that is constantly referred to by the smart contract 102 is registered as a block in each node 101 constructing the blockchain network 100.

Embodiment 1

Figure 4:
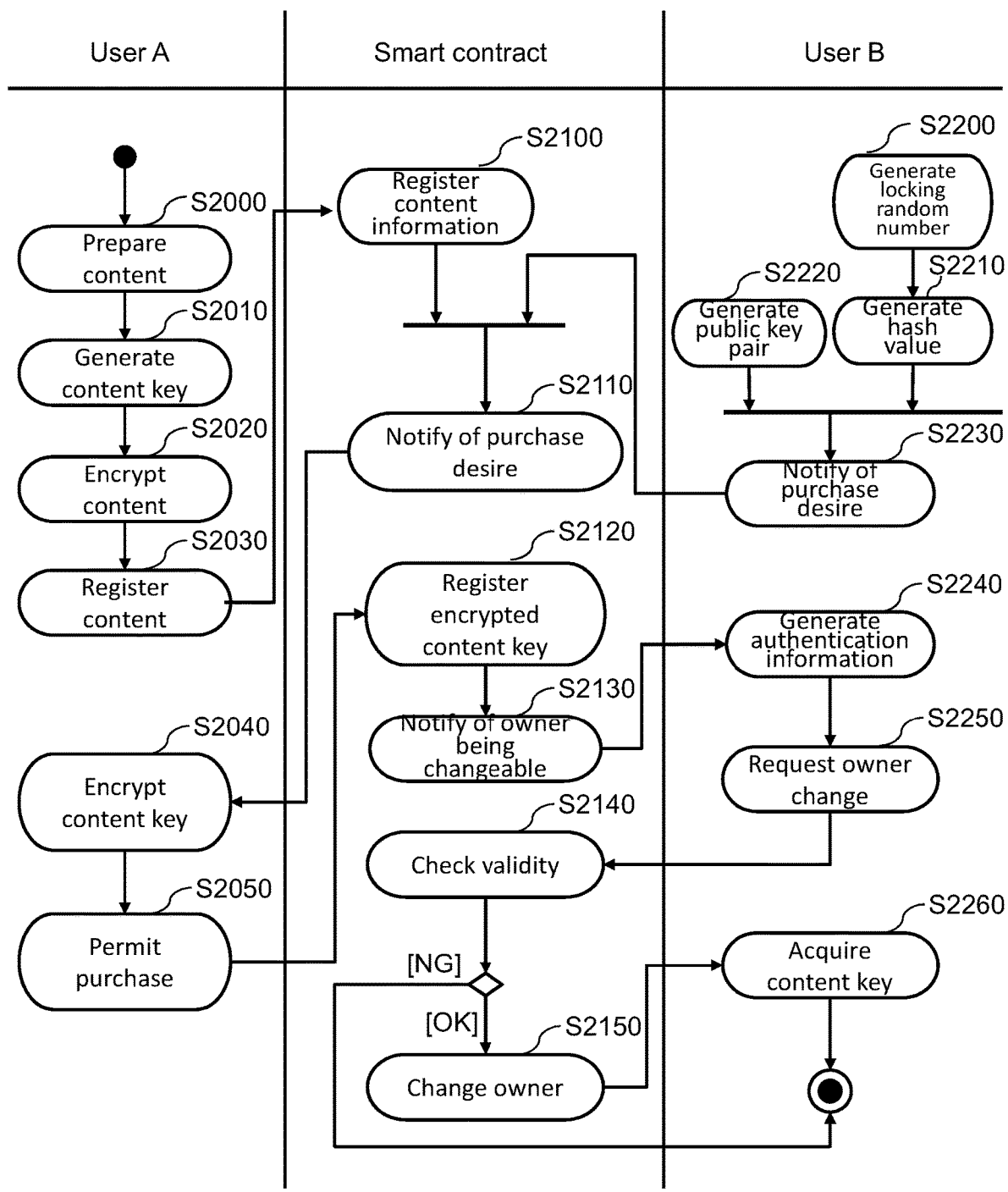
FIG. 4 is an activity diagram illustrating an example of a process of a content protection system.

FIG. 4 is an activity diagram illustrating an example of a process of a content protection system 1 according to Embodiment 1 of the present disclosure. Hereinafter, a user 2 of a transfer source providing a content (more specifically, an NFT corresponding to the content) will be assumed to be user A, and a user 2 of a transfer destination acquiring the content, that is, a use right grantee to whom a right to use the content is granted will be assumed to be user B. In addition, a blockchain network connection apparatus 200 used by user A will be represented as a connection apparatus 200A, and a blockchain network connection apparatus 200 used by user B will be represented as a connection apparatus 200B.

User B may acquire a content at a cost or for free. User A may grant a right of use of a content to user B, or a content may be transferred to user B by deleting a right of use for user A while granting the right of use of a content to user B. In the following description, although a case in which a content is transferred from user A to user B at a cost (in other words, a case in which user B purchases a content from user A) will be described, a process relating to money transfer will be omitted. In addition, although various kinds of information generated by the blockchain network connection apparatus 200 are appropriately managed (stored or the like) by the key management unit 530, in the following description, description of a process of managing information in the blockchain network connection apparatus 200 may be omitted.

First, user A who is a content provider transmits a content prepared by generation or the like of the content to the connection apparatus 200A. The key random number generation unit 520 of the cryptographic processing unit 500 of the connection apparatus 200A generates a hash value of the content as a content checking hash value (Step S2000). As will be described below, the content checking hash value is used by user B who has purchased a piece of encrypted content for checking validity of the content.

The key random number generation unit 520 generates a content cryptographic key that is a cryptographic key used for protecting a content by encrypting the content (Step S2010). The encryption/decryption processing unit 510 encrypts a content using the content cryptographic key (Step S2020). An encryption method for encrypting a content is not particularly limited as long as it can protect the content and, here, is a common key encryption method. In other words, a content cryptographic key is to the same as a content decryption key used for decrypting the content. Hereinafter, a content encryption key (a content decryption key) may be referred to as a content key. The content key is managed (for example, stored) by the key management unit 530.

The encryption/decryption processing unit 510 stores an encrypted content that is a content that has been encrypted in the content server 300 and transmits a registration request for requesting registration of content information about the content to the smart contract 102 of the node 101 (Step S2030). The registration request includes content information. In addition, the content information includes a hash value of the content and reference destination information representing a storage place of the content.

The smart contract 102 issues an NFT in response to a registration request and registers the issued NFT in a blockchain (Step S2100). In addition, in a case in which a content is prepared by user A by acquiring a content prepared by another user from the content protection system 1, the NFT has already been issued, and thus only necessary information may be registered without newly issuing an NFT.

FIG. 5 is a diagram illustrating an example of owner management information included in an NFT. The owner management information 600 illustrated in FIG. 5 is user management information representing owing of a content (that is, a person who can use a content) and has fields 601 to 604.

The field 601 stores an ID that is a token ID used for identifying an NFT. The number of IDs can be configured by an issuer who issues NFTs, and the number is configured to be 100 as an example in FIG. 5. The field 602 stores owner information representing an owner owning a content. The owner is a person generating a content, an agent thereof, or the like at the time of registering an NFT, and is a transfer destination of a content at the time of completion of a transaction.

Here, although the owner information is an address of a public block network chain owned by an individual, the owner information may be any other information as long as an owner can be uniquely identified.

The field 603 stores a content checking hash value. In a case in which the content checking hash value can be checked in other places such as the content server 300 and the like, the field 603 may be omitted. The field 604 stores reference destination information.

In a case in which one or a plurality of content are shared by a plurality of owners (in a case in which a plurality of NFTs are associated with the same content) or the like, a hash value and reference destination information do not need to be stored for each ID. In other words, the owner management information has a configuration that is different in accordance with a content provision method and the like, and an additional table may be included in some cases.

By registering an NFT including the owner management information as above, a state in which other users can purchase the NFT is formed.

The description will be continued with reference to FIG. 4. The user B who is a purchaser of a content instructs the connection apparatus 200B to prepare for the purchase of the content. The key random number generation unit 520 of the connection apparatus 200B generates a random number for locking as information for locking for generating locking information for locking (limiting the access to) a content key (Step S2200). Then, the key random number generation unit 520 generates a hash value of a random number for locking as locking information (Step S2210). The information for locking is not limited to a random number and may be any other information such as a random character line.

In addition, the key random number generation unit 520 generates an authentication public key pair that is a public key pair used in an authentication process for acquiring a content key (Step S2220). The public key pair includes a public key and a secret key.

The locking information and the authentication public key pair are used in an authentication process for acquiring a content key and thus are preferably managed separately in different devices, different paper sheets, or the like instead of being integrally managed as one piece of user management information 212. A specific management method for the locking information and the authentication public key pair may be appropriately determined by the user B in consideration of convenience and the like. In addition, by providing the locking information and the authentication public key pair for another person, a purchased content can be given to the other person as a gift.

Thereafter, in a case in which a content is to be purchased, the user B instructs the connection apparatus 200B to purchase the content. The connection apparatus 200B transmits a purchase desire notification that is a use request requesting use (transfer) of a content to the smart contract 102 in accordance with the instruction (Step S2230).

Figure 6:
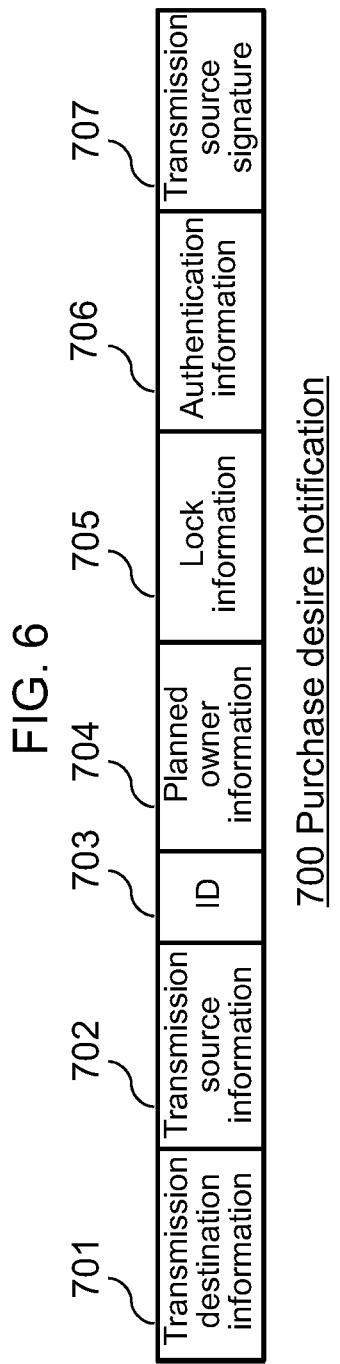
FIG. 6 is a diagram illustrating an example of a purchase desire notification.

FIG. 6 is a diagram illustrating an example of a purchase desire notification. The purchase desire notification 700 illustrated in FIG. 6 has fields 701 to 707.

The field 701 stores transmission destination information that represents a transmission destination of the purchase desire notification 700. In this embodiment, the transmission destination information represents an address of the smart contract 102 as a transmission destination. The field 702 stores transmission source information that represents a transmission source of the purchase desire notification 700. The transmission source information represents an address of the user B who is a transmitter (an address of a public blockchain owned by the user B). The field 703 stores an ID of an NFT corresponding to a content that is a purchase target.

The field 704 stores planned owner information that represents a planned owner who becomes an owner of a content after purchase. In a case in which the planned owner is the user B who is the transmitter of the purchase desire notification, the planned owner information represents an address of the user B. In a case in which the planned owner is a user C who is another user to whom a content is given from the user B as a gift, the planned owner information represents the address of the user C. However, in a case in which the user C does not use a blockchain at a time point of transmitting the purchase desire notification 700, there is no address of the user C. In such a case, the field 704 becomes vacancy information, and, for example, by using locking information and authentication information that is additionally configured, an authorized purchaser is checked. In the planned owner information, the address of the user B may be used in place of the address of the user C. In such a case, the user B needs to provide not only the locking information and the authentication public key pair but also information used for the generation of the address of the user B for the user C. In addition, also in a case in which the user B manages a purchased NFT using another address instead of giving the NFT to the user C as a gift, a similar method may be employed.

The field 705 stores lock information. The field 706 stores authentication information used for authenticating the user B. In this embodiment, the authentication information is a public key included in the authentication public key pair.

The field 707 stores a transmission source signature that represents an electronic signature generated based on the information stored in the fields 701 to 706. The transmission source signature is information that is used for proving the validity of the transmission source of the purchase desire notification 700. Generally, an electronic signature is added in a request for a blockchain. However, in a request for only referring to information and the like, update of data does not occur, and an electronic signature may be not added in many cases.

The description will be continued with reference to FIG. 4. When a purchase desire notification is received, the smart contract 102 checks the validity of the purchase desire notification based on the electronic signature of the purchase desire notification. In a case in which the validity is checked, the smart contract 102 registers planned owner management information about a planned owner based on the purchase desire notification. Then, the smart contract 102 transmits a desire reception notification indicating that the purchase desire notification has been received to the connection apparatus 200A of the user A who is a content provider (step S2110). In addition, instead of the smart contract 102 giving a direct notification, the connection apparatus 200A may be configured to regularly check a log of the blockchain and, when the smart contract 102 is detected to have received a purchase desire notification, acquire a desire reception notification.

FIG. 7 is a diagram illustrating an example of the planned owner management information. The planned owner management information 800 is illustrated in FIG. 7 has fields 801 to 805.

The field 801 stores an ID included in the purchase desire notification (an ID of an NFT corresponding to a content desired to be purchased in the purchase desire notification). The field 802 stores planned owner information included in the purchase desire notification. The field 803 stores lock information included in the purchase desire notification. The field 804 stores authentication information included in the purchase desire notification. The field 805 stores encrypted content key. However, at a time point of Step S2110, an encrypted content key is not stored in the field 805.

The description will be continued with reference to FIG. 4. When a desired reception notification is received, the encryption/decryption processing unit 510 of the blockchain network connection apparatus 200 of the user A generates an encrypted content key acquired by encrypting a content key using the public key that is authentication information included in the desire reception notification (Step S2040). In addition, the encryption/decryption processing unit 510 may acquire authentication information by referring to the planned owner management information 800. In such a case, the authentication information may not be included in the desire reception notification.

Subsequently, the encryption/decryption processing unit 510 transmits a permission notification indicating permission for the purchase of a content to the smart contract 102 (Step S2050). The permission notification includes an encrypted content key.

When a permission notification is received, the smart contract 102 registers an encrypted content key included in the permission notification in the planned owner management information and transitions to a state in which an owner of a content can be changed, that is, a state in which purchase of a content can be made (Step S2120). In addition, the smart contract 102 transmits an owner change possible notification indicating that an owner of a content can be changed to the connection apparatus 200B (Step S2130). Here, although availability/non-availability of purchase of a content is represented by registration/non-registration of an encrypted content key, a flag representing availability/non-availability of purchase of a content may be explicitly included in the planned owner management information.

When an owner change possible notification is received, the key random number generation unit 520 of the blockchain network connection apparatus 200 of the user B generates authentication information used for acquiring a content key for decrypting a purchased content and changing the owner information (Step S2240). More specifically, the encryption/decryption processing unit 510 generates information acquired by encrypting referable information that can be referred to by the smart contract 102 using a secret key of the authentication public key pair as authentication information. For example, the referable information is an address of the smart contract 102 or a constant, a character line, or the like, which is defined in the smart contract 102, that can be referred to by the outside. In addition, the authentication information may be information acquired by encrypting a hash value of the referable information. In other words, generation of authentication information is performed by a process similar to generation of an electronic signature.

The encryption/decryption processing unit 510 transmits an owner change request requesting the acquisition of a content key and change of the owner information to the smart contract 102 (Step S2250). The owner change request includes authentication information and a locking random number. The locking random number is used as unlock information used for releasing the locking of the content key.

Figure 8:
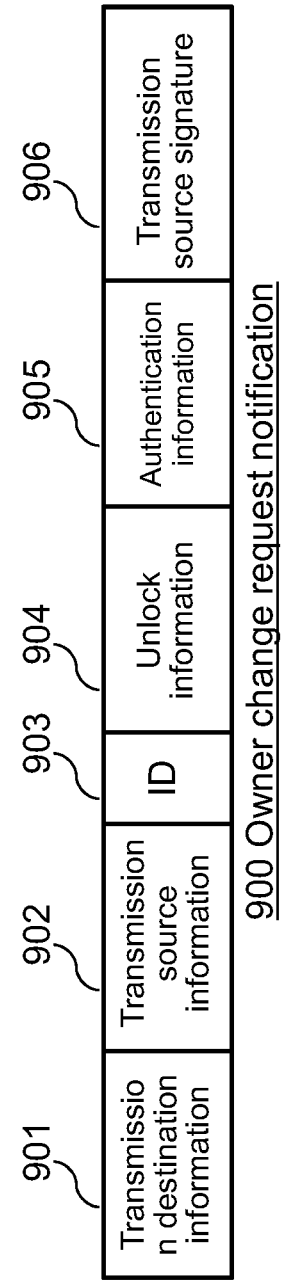
FIG. 8 is a diagram illustrating an example of an owner change request.

FIG. 8 is a diagram illustrating an example of an owner change request. The owner change request 900 illustrated in FIG. 8 has fields 901 to 906.

The field 901 stores transmission destination information representing a transmission destination of the owner change request 900. In this embodiment, this transmission destination information represents an address of the smart contract 102 as a transmission destination. The field 902 stores transmission source information representing a transmission source of the owner change request 900. The transmission source information represents the address of the user B who is a transmitter. The field 903 stores an ID of an NFT corresponding to a content that is a purchase target.

The field 904 stores a locking random number that is unlock information. The field 905 stores authentication information. The field 906 stores a transmission source signature representing an electronic signature generated based on the information stored in the fields 901 to 905.

In addition, a transmitter identified using the transmission source information stored in the field 902 and the transmission source signature stored in the field 906 is a transfer destination of the content, in other words, an owner (a planned owner) after change. Thus, in a case in which the user B gives a content to a user C as a gift, a transmitter of the owner change request 900 is the user C. For this reason, by transmitting an owner change request using the blockchain network connection apparatus 200 other than the connection apparatus 200B of the user B, the user C to whom the content is given as a gift changes the owner to the user C. For this reason, at this time point, the user C needs to store a public blockchain address.

The description will be continued with reference to FIG. 4. When an owner change request is received, the smart contract 102 checks the validity of the owner change request based on the owner change request (Step S2140). More specifically, the smart contract 102 acquires information (a record) having an ID included in the owner change request from the planned owner management information as target information and performs the following three checking processes based on the target information.

In a first checking process, the smart contract 102 checks whether or not the planned owner information included in the target information and the transmission source information included in the owner change request coincide with each other. In a case in which the user B gives a content as a gift to a non-address holder who has no address, the planned owner information is not included in the target information, and thus the first checking process is skipped.

In a second checking process, the smart contract 102 generates a hash value of unlock information included in the owner change request and checks whether or not the hash value coincides with the lock information included in the target information. An original value cannot be acquired from a hash value, and thus persons other than a user knowing the locking random number cannot succeed in the second checking process. In addition, a hash value may be calculated from a predetermined range of a locking random number such that an attach such as a brute force can be handled.

In a third checking process, the smart contract 102 checks the validity of the owner change request using the authentication information included in the owner change request. This authentication information is generated using a method similar to that of the process of generating an electronic signature, and thus the validity of the owner change request can be checked using a process similar to an electronic signature verification process. In other words, the smart contract 102 decrypts the authentication information included in the owner change request using a public key that is authentication information included in the planned owner management information and checks whether or not the decrypted information coincides with the original referable information.

In a case in which all the three checking processes have been successful, the smart contract 102 determines that the owner change request is a valid request. Here, the order in which the three checking processes are performed is not particularly limited. In a case in which any one of the three checking processes is unsuccessful, the smart contract 102 discards the owner change request and ends the process. At this time, by performing transmission of an error message, outputting of an error log, or the like for the transmission source of the owner change request, the smart contract 102 may notify the outside of an indication of an unsuccessful checking process.

In a case in which the owner change request is a valid request, the smart contract 102 updates the owner information of the owner management information with the planned owner information of the planned owner management information (Step S2150).

Then, the smart contract 102 transmits the encrypted content key included in the planned owner management information to the blockchain network connection apparatus 200 of the user B who is the transmission source of the owner change request. The encryption/decryption processing unit 510 of the blockchain network connection apparatus 200 acquires a content key by decrypting the encrypted content key using the secret key of the authentication public key pair (Step S2260) and ends the process. In accordance with this, the user B can acquire an encrypted content from the content storage place by referring to the owner management information and acquire a content by decrypting the encrypted content using the content key. Whether or not the acquired content is a correct content can be checked based on whether or not the hash value of the acquired content and the content checking hash value stored in the owner management information coincide with each other.

In accordance with the processes described above, transmission/reception of the content key can be performed using the blockchain safely without being engaged with other persons, and thus the content can be safely utilized. In the example described above, although the user A generates and provides the content, the user B who has purchased the content may provide the content for another person. At this time, the content key does not need to be changed. In such a case, the processes of Steps S2000 to S2030 may not be performed. Here, in a case in which the content key is not changed, the user A can use the content also after the user B has purchased the content. It is apparent that the user B may change the content key. In addition, the user B may change the storage place of the content.

In addition, a selling type of a content is not particularly limited and, for example, may be an auction type, a lottery type, or the like, and the content may be distributed for free. Furthermore, the selling of a content may be performed using another smart contract or an external program such as an external application program. In such a case, for example, a purchase desire notification is transmitted to a selling device in which an external program is installed, and when a purchaser finalizes the purchase, the purchase desire notification is transmitted from the selling device to the smart contract 102. In such a case, the transmission source information and the transmission source signature of the purchase desire notification correspond to not an address and a signature of the user desiring to purchase the content but an address of the selling device and a signature corresponding thereto.

In the example described above, in order for the user B to acquire an NFT and a content key, although both the authentication public key pair and the hash value of the locking random number are used, only one thereof may be used, or none of both of them may be used. However, in a case in which an authentication public key pair is not generated, a structure for safely acquiring a content key is additionally required. For example, the blockchain network connection apparatus 200 manages a public key pair for an electronic signature granted to a request notification requesting the blockchain to perform a process (transaction), and thus the content key can be safely transmitted and received using the public key pair in place of the authentication public key pair.

In a case in which at least one of the authentication public key pair and the hash value of the locking random number is not used, those do not need to be managed in the planned owner management information, and thus the amount of data stored in the blockchain can be decreased. Even in a case in which these are not used, by limiting users who have authority for access to the owner management information and the planned owner management information or for updating the information described above as owners and planned owners of content, the security can be improved.

In addition, in the example described above, although the user B manages the encrypted content key acquired in Step S2260, the encrypted content key may be stored in the smart contract 102 and may be acquired by the user B as necessary. In such a case, even after a content is purchased, the planned owner management information is stored. In the case, in the planned owner information, a value representing a current owner is stored, or information representing a current owner is stored using another field. In addition, separately from the planned owner management information, information used for managing the content key may be stored in the smart contract 102.

In addition, the locking random number is notified to the smart contract 102 as unlock information of the owner change request in Step S2250 and thus is shared in the entire blockchain. For this reason, in a case in which the user B who has purchased a content provides the content for another person, a locking random number needs to be newly generated. In addition, in a case in which the authentication information is updated, the update method is appropriately configured such that the same value can be referred to by the blockchain network connection apparatus 200 and the smart contract 102. In such a case, for example, the key acquisition request corresponds to addition of a new lock value and authentication information update information to the owner change request. In addition, also in the acquisition of a key, only one of the public key pair and the hash value that is lock information may be used, or none of both thereof may be used.

As described above, according to this embodiment, the connection apparatus 200A receives a purchase desire notification including a public key from the connection apparatus 200B via the blockchain network 100 and transmits an encrypted content key acquired by encrypting a content key using the public key to the connection apparatus 200B via the blockchain network 100. The connection apparatus 200B transmits the purchase desire notification to the connection apparatus 200A and transmits a transmission source information representing a transfer destination of the content to the blockchain network 100. In addition, the connection apparatus 200B decrypts the encrypted content key from the connection apparatus 200A using the stored secret key. In a case in which the encrypted content key is received, the blockchain network 100 changes an owner represented in the owner management information to the transfer destination. In accordance with this, while the content key is encrypted and is transferred to a transfer destination, the owner change is changed in the blockchain network 100, and thus the safety of the content can be improved without using a centralized system.

In addition, in this embodiment, when a purchase desire notification including a hash value of a locking random number is transmitted, and an owner change possible notification is received, the connection apparatus 200B transmits the locking random number to the blockchain network 100. In a case in which an encrypted content key is received, the blockchain network 100 transmits an owner change possible notification to the connection apparatus 200B, and thereafter, in a case in which the hash value of the locking random number from the connection apparatus 200B and the hash value of the purchase desire notification coincide with each other, the blockchain network 100 changes the owner and transmits the encrypted content key to the connection apparatus 200B. In accordance with this, the safety of the content can be further improved.

In addition, in this embodiment, the connection apparatus 200B transmits authentication information encrypted using the referable information that can be referred to by the blockchain network 100 using the secret key to the blockchain network 100. In a case in which information acquired by decrypting the authentication information using the public key coincides with the referable information, the blockchain network 100 changes the owner and transmits the encrypted content key to the connection apparatus 200B. In accordance with this, the safety of content can be further improved.

In addition, in this embodiment, transmission source information representing a transfer destination may be transmitted from a connection apparatus other than the connection apparatus 200B transmitting the purchase desire notification. In accordance with this, a user of the connection apparatus 200B transmitting the purchase desire notification transfers the public key pair and the like to a third party, thereby being able to give the content to the third party as a gift.

Embodiment 2

In this embodiment, an example in which a content key is transmitted and received using a key replacement encryption method capable of replacing a key will be described. Hereinafter, a key replacement encryption method using a public key encryption scheme will be described as an example.

In this replacement encryption method, a common parameter g that is a parameter that can be commonly referred to by users (blockchain network connection apparatuses 200) is defined. A secret key and a public key generated by the connection apparatus 200A of the user A will be respectively denoted by s_A and h_A, and a secret key and a public key generated by the connection apparatus 200B of the user B (or the connection terminal 400 in a case in which management of the key is performed by the user B) will be respectively denoted by s_B and h_B. The public key is defined using a secret key and the common parameter g. For example, the public key h_A of the user A is h_A=g^s_A. Here, the operator ^ represents a power. In addition, the common parameter g is stored in a place that can be referred to by the smart contract 102, the blockchain network connection apparatus 200, and the like in advance.

In a case in which data of an encryption data is denoted by M, encrypted data acquired by encrypting the data M using a key X will be represented as ENC(X, M). In addition, a cryptogram including encrypted data ENC(X, M) and a replacement key Y capable of replacing the encrypted key for decrypting the encrypted data ENC(X, M) will be represented as C=(Y, ENC(X, M)). In this embodiment, a cryptogram C of the connection apparatus 200A of the user A will be denoted by a cryptogram C_A, a cryptogram C of the connection apparatus 200B of the user B will be denoted by a cryptogram C_B, and the cryptogram C_A is assumed to be C_A=(h_A^r, ENC(g^r, M)). Here, r is a random number, and the operator ^ represents a power.

A decryption process for the cryptogram C_A is performed by deriving an encrypted key g^r from the replacement key h_A^r included in the cryptogram C_A. More specifically, by transforming the replacement key h_A^r into "(h_A^r)^(1/s_A)=(g^(s_A*r))^(1/s_A)=g^r" using the secret key s_A of the user A, the secret key g^r acquired by encrypting the cryptogram C_A can be acquired, and thus, by performing a decryption process DEC, a message M can be returned to a plain text as DEC(g^r, (ENC(g^r, M))=M.

In addition, in key replacement from the user A to the user B, a parameter (s_B/s_A) generated from the secret keys is used. By taking the replacement key h_A^r included in the cryptogram C_A to the power of the parameter (s_B/s_A), it can be transformed as (h_A^r)^(s_B/s_A)=g^(s_A*r*(s_B/s_A))=g^(r*s_B)=h_B^r, and the cryptogram of the user A can be transformed into the cryptogram C_B=(h_B^r, ENC(g^r, M)) of the user B. Thus, by safely using the parameter s_B/s_A, key replacement from the user A to the user B can be realized while inhibiting leakage of data. In addition, in Embodiment 1 in which a public key method is used, there is an upper limit on the size of data that is an encryption target. In this embodiment, an arbitrary encryption method can be used for encrypting a content, and thus the upper limit of the size of data that is an encryption target can be resolved.

Figure 9:
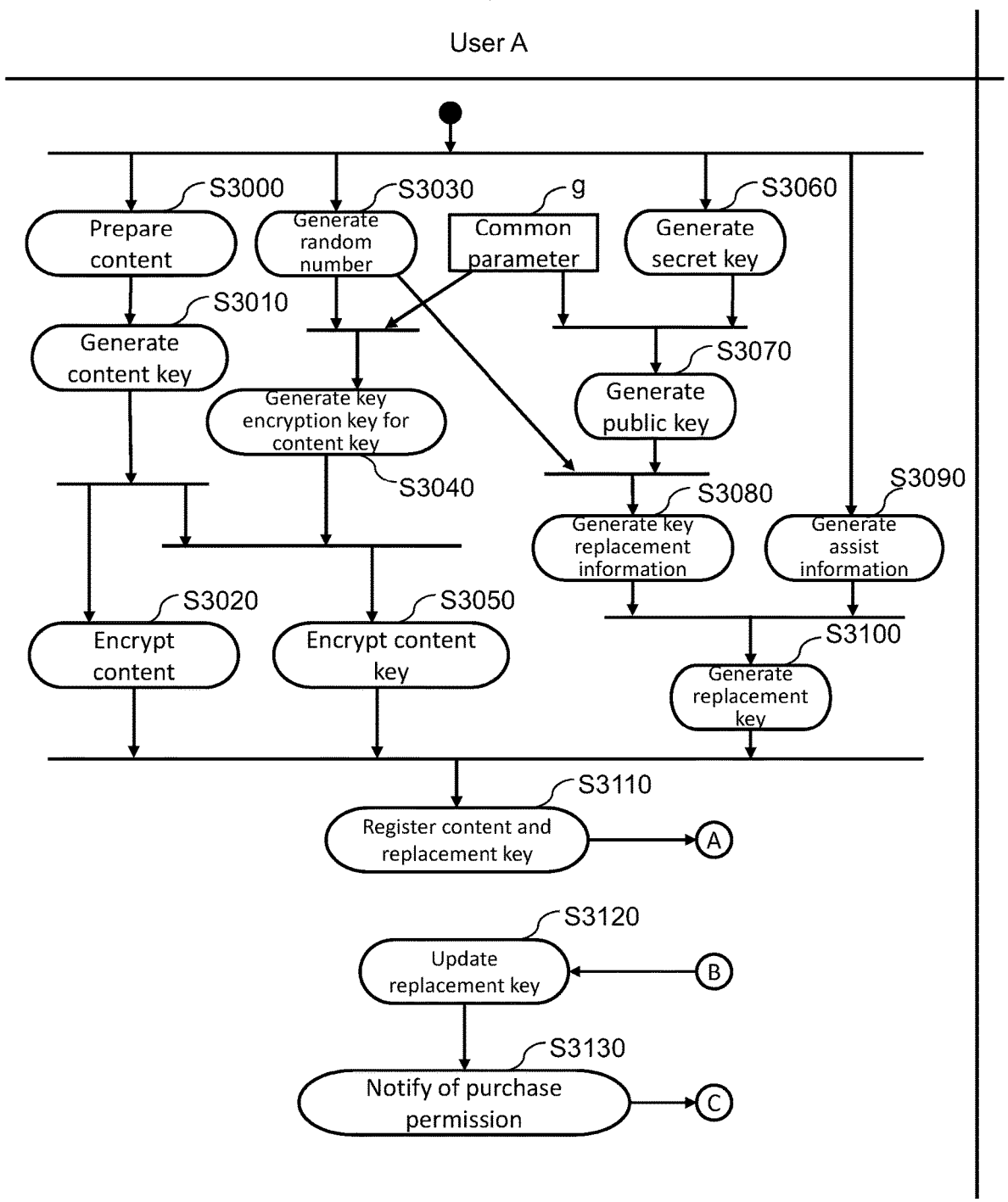
FIG. 9 is a diagram illustrating a process of a content protection system according to Embodiment 2.
Figure 10:
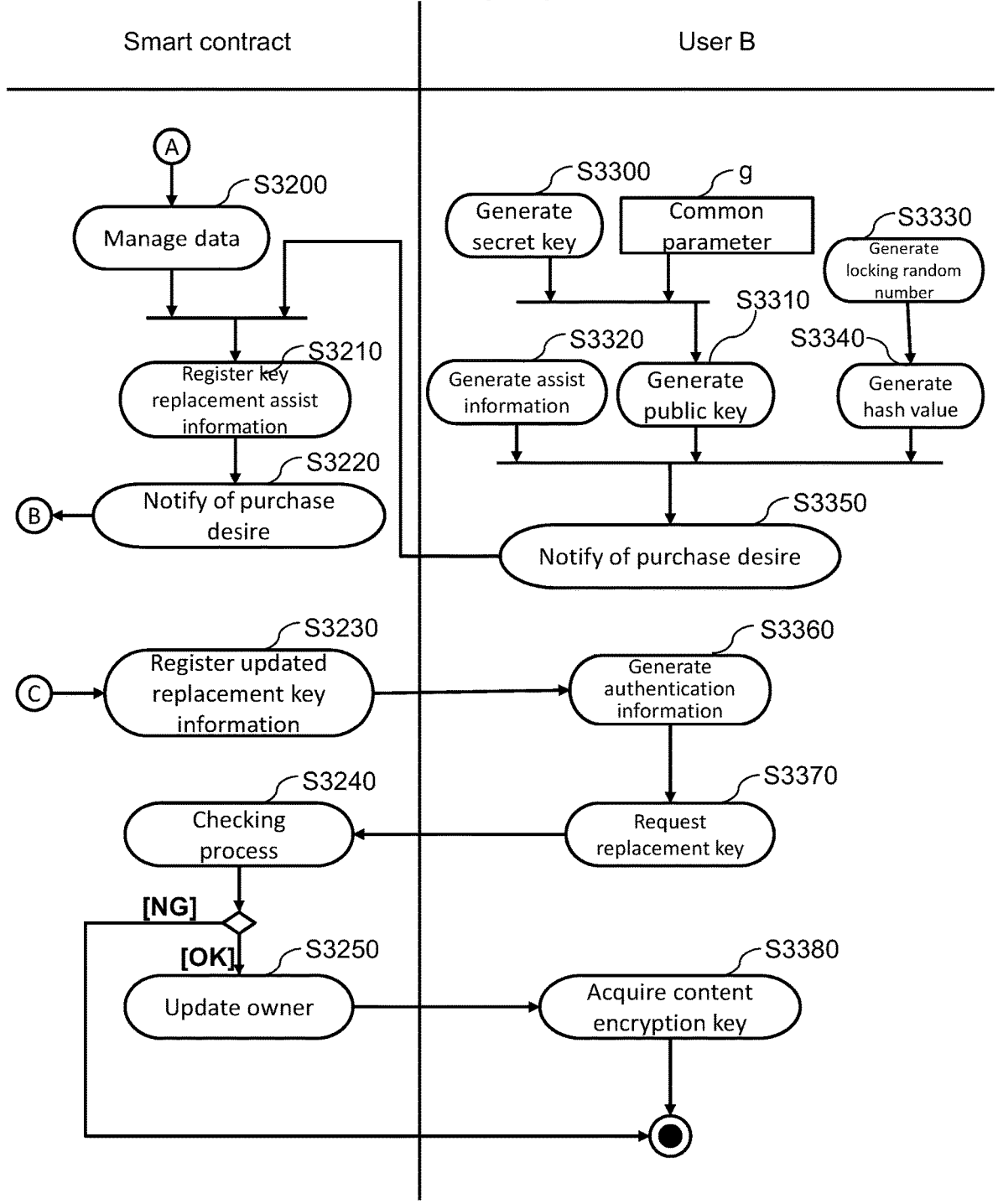
FIG. 10 is a diagram illustrating a process of a content protection system according to Embodiment 2.

FIGS. 9 and 10 are diagrams illustrating a process of a content protection system 1 according to Embodiment 2. More specifically, FIG. 9 is a flowchart illustrating a process relating to the connection apparatus 200A of the user A, and FIG. 10 is an activity diagram illustrating processes relating to the connection apparatus 200B of the user B and the smart contract 102.

A user A who is a content provider transmits a prepared content to the connection apparatus 200A. The key random number generation unit 520 of the cryptographic processing unit 500 of the connection apparatus 200A generates a hash value of the content as content checking hash value (Step S3000). The key random number generation unit 520 generates a content key (Step S3010). The encryption/decryption processing unit 510 encrypts the content using the content key (Step S3020).

Subsequently, the key random number generation unit 520 generates a key encrypting random number r for key encryption used for encrypting the content key (Step S3030) and generates a key encryption key (key description key) g^r that is a key for encrypting and decrypting the content key using the key encrypting random number r and the common parameter g (Step S3040). Then, the encryption/decryption processing unit 510 generates an encrypted content key acquired by encrypting the content key using the key encryption key g^r (Step S3050). Here, the content key will be denoted by K, and the encrypted content key will be denoted by ENC(g^r, K). In addition, the content key to which predetermined information is added may be encrypted and may be regarded as the encrypted content key.

Next, the key random number generation unit 520 generates a secret key s_A using a random number and the like (Step S3060) and generates a public key h_A=g^s_A using the secret key s_A and the common parameter g (Step S3070). The secret key s_A and the public key h_A becomes a public key pair for replacement with the key encryption key g^r. In addition, the key random number generation unit 520 generates key replacement information h_A^r used for replacement with the key encryption key g^r using the public key h_A and a random number r for key encryption (Step S3080) and generates assist information R_A*s_A of the user A used in replacement of the key using the secret key s_A and a random number R_A for assist information (Step S3090). Then, the key random number generation unit 520 generates a replacement key (h_A^r)^(1/(R_A*s_A)) for replacement with the key encryption key g^r on the basis of the key replacement key information h_A^r and the assist information R_A*s_A (Step S3100).

In addition, in replacement of the key, although the information s_B/s_A based on the secret keys of the user A and the user B is used, when the secret keys are simply transmitted and received between the users A and B, one user's secret key leaks to the other person. In this embodiment, in order to prevent leakage of a secret key, information acquired by performing an operation (more specifically, multiplication) of the secret key s_A of the user A on the random number R_A for assist information is generated as assist information R_A*s_A. In addition, the execution order of processes of Steps S3000 to S3100 is not particularly limited, as long as dependence relations among the processes can be maintained.

Thereafter, the key random number generation unit 520 stores the encrypted content in the content server 300, and a registration request requesting registration of content information relating to the content to the smart contract 102 of the node 101. The content information of this embodiment includes an encrypted content key and a replacement key.

Description will be presented with reference to FIG. 10. The smart contract 102 issues an NFT in response to a registration request and registers the issued NFT in the blockchain (Step S3200).

FIG. 11 is a diagram illustrating an example of owner management information included in an NFT of this embodiment. Owner management information 600A illustrated in FIG. 11 has fields 605 and 606 in addition to the fields 601 to 604 of the owner management information of Embodiment 1 illustrated in FIG. 5. The field 605 stores a replacement key, and the field 606 stores an encrypted content key.

The description will be continued with reference to FIG. 10. Similar to Embodiment 1, in the connection apparatus 200B of the user B who is a purchaser, the key random number generation unit 520 generates a locking random number (Step S3330) and generates a hash value of the locking random number as lock information (Step S3340).

In addition, in order to acquire a content key, the key random number generation unit 520 generates an authentication public key pair. Here, although the authentication public key pair will be described as being commonly used as the public key pair used for updating the replacement key, such a public key pair may be separately generated.

More specifically, the key random number generation unit 520, similar to the connection apparatus 200A of the user A, generates a secret key s_B using a random number or the like (Step S3300) and generates a public key h_B=g^s_B using the secret key s_B and the common parameter g (Step S3310). In addition, the key random number generation unit 520 generates assist information R_B*s_B of the user B using the secret key s_B and the random number R_B for assist information (Step S3320).

Thereafter, in a case in which a content is to be purchased, the user B instructs the connection apparatus 200B to purchase the content. The connection apparatus 200B transmits a purchase desire notification to the smart contract 102 in accordance with the instruction (Step S3350).

Figure 12:
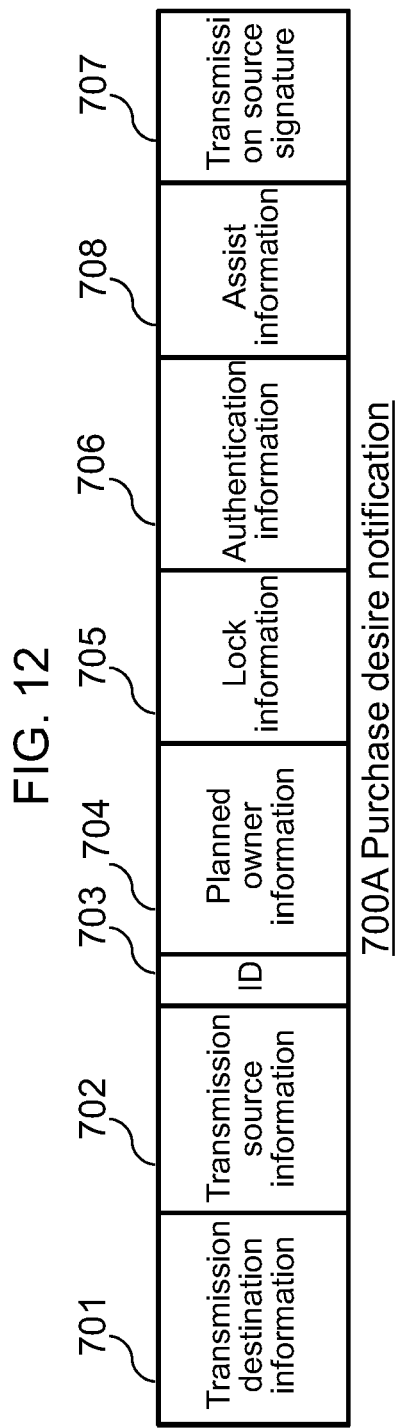
FIG. 12 is a diagram illustrating another example of a purchase desire notification.

FIG. 12 is a diagram illustrating an example of the purchase desire notification of this embodiment. The purchase desire notification 700A illustrated in FIG. 12 has a field 708 in addition to the fields 701 to 707 of the purchase desire notification 700 of Embodiment 1 illustrated in FIG. 6. The field 708 stores assist information.

The description will be continued with reference to FIG. 10. When a purchase desire notification is received, the smart contract 102 checks validity of the purchase desire notification on the basis of the electronic signature of the purchase desire notification. In a case in which the validity is checked, the smart contract 102 registers planned owner management information on the basis of the purchase desire notification (Step S3210).

FIG. 13 is a diagram illustrating an example of planned owner management information of this embodiment. The planned owner management information 800A illustrated in FIG. 13 has the fields 801 to 804 of the planned owner management information 800 of Embodiment 1 and has fields 806 and 807 in place of the field 805. The field 806 stores assist information of a planned owner (the user B) included in the purchase desire notification, and the field 807 stores a replacement key of the planned owner. In addition, the replacement key of the planned owner is not registered in Step S3210.

The description will be continued with reference to FIG. 10. The smart contract 102 generates an updated replacement key acquired by updating the replacement key of the user A included in the owner management information on the basis of the assist information of the user B and transmits a purchase desire notification including the updated replacement key to the connection apparatus 200A of the user A (Step S3220). More specifically, the updated replacement key is information acquired by taking the replacement key of the user A to the power of the assist information of the user B. In other words, the updated replacement key is $((h\_A^\wedge r)^\wedge(1/(R\_A*s\_A)))^\wedge(R\_B*s\_B)=(h\_A^\wedge r)^\wedge((R\_B*s\_B)/(R\_A*s\_A))$.

Referring to FIG. 9, when a purchase desire notification is received, the encryption/decryption processing unit 510 of the connection apparatus 200A replaces the updated replacement key of the user B with the updated replacement key included in the purchase desire notification (Step S3120).

More specifically, the encryption/decryption processing unit 510 takes the updated replacement key to the power of the random number R_A for assist information generated in Step S3090. In other words, the encryption/decryption processing unit 510 calculates $((h\_A^\wedge r)^\wedge((R\_B*s\_B)/(R\_A*s\_A)))^\wedge R\_A$. When this is calculated, the following is acquired.

$$((h\_A^\wedge r)^\wedge((R\_B^*s\_B)/(R\_A^*s\_A)))^\wedge R\_A = (h\_A^\wedge r)^\wedge((R\_B^*s\_B)/s\_A) =$$
$$(g^\wedge s\_A)^\wedge r^*((R\_B^*s\_B)/s\_A) = g^\wedge(s\_A^* r^*((R\_B^*s\_B)/s\_A) =$$
$$g^\wedge(r^* R\_B^* s\_B) = (g^\wedge s\_B)^\wedge(r^* R\_B) = (h\_B^\wedge r)^\wedge R\_B$$

Thus, the key of the user A can be replaced with the key of the user B.

The encryption/decryption processing unit 510 notifies the smart contract 102 of a purchase permission notification including the key of the user B acquired through replacement (Step S3130).

The description will be continued with reference to FIG. 10. When the purchase permission notification is received, the smart contract 102 stores the key of the user B, which has been acquired through replacement, included in the purchase permission notification in the planned owner management information as a replacement key. Then, the smart contract 102 transmits an owner change possible notification indicating that the purchase process has been completed and the owner of the content can be changed to the connection apparatus 200B of the user B (Step S3230).

When the owner change possible notification is received, similar to Embodiment 1, the encryption/decryption processing unit 510 of the connection apparatus 200B of the user B generates authentication information (Step S3360) and transmits an owner change request requesting acquisition of a replacement key that can be decrypted using a random number R_B for assist information and the secret key s_B to the smart contract 102 (Step S3370).

When the owner change request is received, similar to Embodiment 1, the smart contract 102 checks whether or not the owner change request is a valid request (Step S3240) and, in a case in which the owner change request is a valid request, updates the owner information of the owner management information with the planned owner information of the planned owner management information (Step S3250).

Then, the smart contract 102 transmits a replacement key of the planned owner included in the planned owner management information and an encrypted content key included in the owner management information to the connection apparatus 200B of the user B who is the transmission source of the owner change request. The encryption/decryption processing unit 510 of the connection apparatus 200B receives the replacement key and the encrypted content key and acquires a content key by decrypting the encrypted content key on the basis of the replacement key (Step S3380). In accordance with this, the encrypted content can be decrypted.

As a method for acquiring a content key, the content key can be acquired by performing the following calculation using the replacement key of the planned owner and the assist information R_B*s_B stored in the connection apparatus 200B. In other words, the key of the user B can be transformed as below.

$$((h\_B^\wedge r)^\wedge R\_B)^\wedge(1/(R\_B^*s\_B)) =$$
$$((g^\wedge(s\_B^*r))^\wedge R\_B)^\wedge(1/(R\_B^*s\_B)) = g^\wedge((s\_B^*r^*R\_B)/(R\_B^*s\_B)) = g^\wedge r$$

Thus, the key g^r used for encrypting the content, which has been configured by the user A, can be acquired. In accordance with this, the encrypted content can be decrypted.

In accordance with the process described above, key replacement can be performed through the smart contract 102, and a content can be safely used also in a distributed environment. Also in this embodiment, modified examples like Embodiment 1 can be employed. For example, a method for selling a content may be implemented in an external program. In addition, only one of lock information and authentication information may be used, or none of both thereof may be used.

In this embodiment, although the assist information used for replacement of a key is registered in the smart contract 102, instead of giving a notification of the assist information in Step S3350, the blockchain network connection apparatus 200 may read a replacement key registered in the smart contract 102, perform calculation using the replacement information of the user B, and give a notification of a result of the calculation. In such a case, the assist information does not need to be stored in the planned owner management information, and thus the process of Step S3210 may be omitted, and updated replacement key information is configured in the purchase desire notification in place of the replacement information.

Similar to Embodiment 1, by using the method described with reference to FIGS. 9 and 10, the user B can sell the purchased content. At that time, in a case in which the content secret key is not changed, the processes of Steps S3000 to S3050 may not be performed. In addition, in a case in which the public key pair is not changed, the processes of Steps S3060 to S3090 may not be performed, and the replacement key $(h\_B\hat{}r)\hat{}(1/(R\_B*s\_B))$ generated in Step S3100 may be registered in Step S3110. In addition, also in a case in which a storage place of a content is changed, similarly, the changed storage place is notified to the smart contract 102 and is registered.

In addition, no registration of a replacement key, which is performed by the owner of a content, may represent that "the content of the target cannot be sold", or an owner of a content may be able to explicitly register selling/no-selling of the content. In such a case, when the owner is changed, a replacement key may be automatically registered, or a parameter that can be transformed from $(h\_A\hat{}r)\hat{}(1/(R\_A*s\_A))$ to $(h\_B\hat{}r)\hat{}(1/R\_B*s\_B))$ may be registered using a purchase desire notification. In the latter case, for example, in Step S3320, the blockchain network connection apparatus 200 of the user B generates two values of $R\_B*s\_B$ and $(R\_B\hat{}2)*s\_B$ as assist information, acquires a replacement key $(h\_A\hat{}r)\hat{}(1/(R\_A*s\_A))$ registered in the smart contract 102, and calculates $(h\_A\hat{}r)\hat{}((R\_B*s\_B)/(R\_A*s\_A))$. In Step S3350, the blockchain network connection apparatus 200 notifies the smart contract 102 of $(R\_B\hat{}2)*s\_B$ as the assist information. The smart contract 102 transmits the updated replacement key $(h\_A\hat{}r)\hat{}((R\_B*s\_B)/(R\_A*s\_A))$ to the blockchain network connection apparatus 200 of the user A (Step S3220), the blockchain network connection apparatus 200 performs replacement of the key by multiplying the replacement key by $(R\_A)$ (Step S3120) and notifies the smart contract 102 of $(h\_B\hat{}r)\hat{}R\_B$ that is acquired as a result thereof (Step S3130). The smart contract 102 performs calculation of the notified key acquired through replacement to the power of the assist information notified from the user B. In accordance with this, the key acquired through replacement can be transformed into $(h\_B\hat{}r)\hat{}R\_B\hat{}(1/((R\_B\hat{}2)*s\_B))=(h\_B\hat{}r)\hat{}(1/(R\_B*s\_B))$. In accordance with this, the user B can perform replacement with the replacement key of the user B at the time of finalizing purchase of a content. In this key, information included in the blockchain network connection apparatus 200 of the user B is used, and thus a content secret key $g\hat{}r$ can be acquired from this key.

In addition, when both $(R\_B*s\_B)$ and $(R\_B\hat{}2)*s\_B$ are in public, the random number $R\_B$ can be calculated, and thus, in the example described above, none of both thereof is notified to the smart contract 102. The reason for this is that, in a case in which the random number $R\_B$ is calculated, there is concern that the secret key $s\_B$ of the user B may leak from the replacement key $(h\_B\hat{}r)\hat{}(1/(R\_B*s\_B))$ of the user B.

In a case in which an updated replacement key is generated by the smart contract 102, by generating two types of random numbers using the blockchain network connection apparatus 200 of the user B, leakage of the secret key $s\_B$ can be prevented. More specifically, the blockchain network connection apparatus 200 generates two random numbers $R\_B1$ and $R\_B2$ in Step S3320, generates a value $R\_B1*s\_B$ used for updating the replacement key and a value $R\_B2/((R\_B1\hat{}2)*s\_B)$ used by the user B for further updating the key after replacement with a replacement key of the user B, and transmits the values to the smart contract 102 in Step S3350. The smart contract 102 registers $R\_B2/((R\_B1\hat{}2)*s\_B)$ for update in Step S3210, updates the replacement key of the user A using $R\_B*s\_B$, and transmits the updated replacement key. The replacement key is configured to be $(h\_B\hat{}r)\hat{}(R\_B1*R\_B2)$ by the blockchain network connection apparatus 200 of the user A, and thus this is transformed into $(h\_B\hat{}r)\hat{}((R\_B1*R\_B2)*((R\_B2/((R\_B1\hat{}2)*s\_B)))=(h\_B\hat{}r)\hat{}(R\_B\hat{}2/(R\_B1*s\_B))$.

In a case in which the user C who has purchased a content from the user B sells the content, the process may be similarly performed. Here, in a case in which the same random number is used several times, there is concern that there may be a problem in the encryption strength, and thus it is preferable that the random numbers be appropriately generated.

As described above, also in this embodiment, while the content key is encrypted and is transferred to a transfer destination, the owner change be changed in the blockchain network 100, and thus the safety of the content can be improved without using a centralized system.

Embodiment 3

In this embodiment, a method for composing a random number of a content secret key will be described. The flow of the process is similar to Embodiment 1, and thus description will be presented using FIG. 4.

First, similar to Embodiment 1, the processes of Steps S2000 to S2030 are performed. Here, in Step S2010, the key random number generation unit 520 generates a random number $R\_A$ together with the content key and generates replacement information-added content key by composing the content key with the random number $R\_A$. In this embodiment, an exclusive logical sum XOR is used in the composition. In other words, when the content encryption key is $K\_C$, information generated through composition become $R\_A$ XOR $K\_C$. In addition, the blockchain network connection apparatus 200 of the user A has a public key pair for reception that is used for safely receiving information notified from a purchaser of a content. The public key pair for reception is information similar to authentication information included in the blockchain network connection apparatus 200 of the user B, and a public key included in the public key pair for reception is notified to the smart contract 102 in accordance with a registration request.

The smart contract 102 registers an NFT in response to the registration request (Step S2100).

FIG. 14 is a diagram illustrating an example of owner management information included in an NFT. The owner management information 600B illustrated in FIG. 14 has fields 607 and 608 in addition to the fields 601 to 604 of the owner management information of Embodiment 1 illustrated in FIG. 5. The field 607 stores a public key of an owner of a content, and the field 608 stores a replacement information-added content encryption key.

The description will be continued with reference to FIG. 4. Thereafter, the connection apparatus 200B of the user B who is a purchaser of the content performs processes similar to Steps S2200 to S2230, and a purchase desire notification is transmitted to the smart contract 102.

Here, the connection apparatus 200B further generates key replacement information used for replacing the key and gives a notification to the smart contract 102 using the purchase desire notification. More specifically, the connection apparatus 200B generates a random number R_B used as an encryption key dedicatedly used for the user B separately from the locking random number generated in Step S2200. Then, the blockchain network connection apparatus 200 generates an encrypted random number ENC_A(R_B) acquired by encrypting the random number R_B using the public key of the owner included in a record of an NFT that is a purchase target in the owner management information managed by the smart contract 102 as replacement information. Although the purchase desire notification of this embodiment is similar to the purchase desire notification 700A of Embodiment 2 illustrated in FIG. 12, an encrypted random number ENC_A(R_B) is stored in the field 708.

When the purchase desire notification is received, similar to Embodiment 1, the smart contract 102 registers planned owner management information and transmits a desire reception notification to the connection apparatus 200A of the user A (Step S2110). Although the planned owner management information of this embodiment is similar to the planned owner management information 800A of Embodiment 2 illustrated in FIG. 13, an encrypted random number ENC_A(R_B) is stored in the field 806.

When a desire reception notification is received, although the encryption/decryption processing unit 510 of the connection apparatus 200A of the user A encrypts the content encryption key using the public key generated by the user B in Embodiment 1, in this embodiment, instead of encrypting the content encryption key, the following processes are performed. In other words, the encryption/decryption processing unit 510 acquires the encrypted random number ENC_A(R_B) that is key replacement information by referring to the planned owner management information 800A and decrypts the encrypted random number ENC_A(R_B) using the secret key included in the public key pair for reception described above to acquire the random number R_B. The encryption/decryption processing unit 510 generates information acquired by composing the acquired random number R_B and the random number R_A described above as a replacement key. In this embodiment, exclusive logical sum XOR is used for the composition, and thus the replacement key is R_B XOR R_A. The encryption/decryption processing unit 510 transmits a permission notification including the replacement key to the smart contract 102 (Steps S2040 to S2050).

When a permission notification is received, the smart contract 102 registers the replacement key included in the permission notification in the planned owner management information (Step S2120) and transmits an owner change possible notification to the blockchain network connection apparatus 200 of the user B (Step S2130).

Thereafter, similar to Embodiment 1, processes of Steps S2240, S2250, S2140, S2150, and S2260 are performed. Here, in the process of Step S2150 for updating the owner management information, the smart contract 102 generates a key for the user B and registers the key in the owner management information. More specifically, the smart contract 102 composes the replacement information-added content encryption key included in the owner management information and the planned owner replacement key registered in the planned owner management information in Step S2240 and registers a result of the composition as a key for the user B. In other words, the smart contract 102 derives and registers (R_A XOR K_C) XOR (R_B XOR R_A)=R_B XOR K_C as a key for the user B. In this way, by composing the replacement keys, a key not including the random number R_A can be generated. In addition, only a user who knows the random number R_B can acquire a content encryption key K_C. In other words, only the user B or a user for whom the random number R_B has been provided from the user B can acquire the content encryption key K_C. Thus, in this embodiment, even when a random number is combined with the encrypted key, key replacement can be safely performed.

Also in this embodiment, modified examples similar to those of Embodiment 1 and Embodiment 2 can be implemented. For example, a method for selling a content may be implemented in an external program. In addition, only one of the lock information and the authentication information may be used, or none of both thereof may be used.

In Embodiment 2, a parameter that is necessary for replacement of a key is combined with a parameter, and, in Embodiment 3, encryption is performed using a public key of the owner. A third-party device may be requested to perform such a process. This third-party device may constantly provide the service or may provide the service only in a necessary period using a cloud service or the like. For example, the connection apparatus 200B of the user B transmits a purchase desire notification to a third-party device instead of the smart contract 102 (see Steps S2230 and S3350). At that time, in Embodiment 2, the connection apparatus 200B transmits the secret key S_B, and, in Embodiment 3, the random number R_B is transmitted to a third-party device, and connection destination information and the like of the third-party device are notified to the smart contract 102 as a purchase desire notification. The smart contract 102 notifies the notified connection destination information to the user A. The connection apparatus 200A of the user A, similar to the user B, transmits information that is necessary for a connection destination of the third-party device. More specifically, the connection apparatus 200A transmits the secret key s_A in Embodiment 2, and the random number R_A is transmitted in Embodiment 3. The third-party device generates s_B/s_A in Embodiment 2 and generates R_A XOR R_B in Embodiment 3 and returns it to the connection apparatus 200A of the user A. The connection apparatus 200A receives the information, and the user A receives the information and notifies of the parameter generated by the third-party device as a purchase permission notification (Steps S2050 and S3130).

In a case in which the user A cannot trust a service provided by the third-party device, the user A may reject a purchase desire or may notify another third-party device, which can be trusted, of the user B to retransmit the purchase desire notification. In addition, a service permitted to be used by the user A may be registered in the smart contract 102. Furthermore, the third-party device may directly access the smart contract 102. In such a case, the processes performed by the connection apparatuses of the users A and B are transferred to the third-party device, and thus a basic function for a connection to the blockchain network 100 is required in the third-party device.

In addition, in a case in which there is a service for requesting key management required for a connection of the blockchain network 100, the process of a key management/approval system may be transferred from the initial secret key management to the service side. In this way, in a case in which generation of a key replacement parameter can be transferred to a third party that can be trusted, the replacement assist information in Embodiment 2 becomes unnecessary, and the user A registers a general public key such as "h_A^r" as the replacement key of the user A. In such a case, the replacement assist information may be managed on the service side.

In each of the embodiments described above, an example in which the owner of the NFT is changed to a purchaser has been described, a content use permission may be managed using the NFT. In a case in which one content is used by a plurality of persons, the content encryption key is shared among the plurality of persons. At this time, in a case in which an encryption key of a content leaks, there is concern that the safety of the content cannot be secured. In such a case, the content needs to be provided for the owner and the other users by encrypting the content using another content key. For this, by storing the authentication information of the owner and the assist information of the key replacement, it can be efficiently handled. Hereinafter, the method thereof will be described.

The connection apparatus 200A of the user A that has detected leakage of the content key newly generates a content key, generates a newly encrypted content acquired by encrypting the content, and replaces the encrypted content that has already been stored with the newly-encrypted content. In addition, the connection apparatus 200A encrypts the content key using the public key of the owner registered as authentication information (a public key for a signature of the owner in a case in which the authentication information is not used) and stores the encrypted content key in the owner management information. In Embodiment 2 or 3, in a case in which the assist information or the key replacement information is registered, a replacement key dedicatedly used by each user, which is generated using the registered information, may be registered in the owner management information.

In each of the embodiments, a purchase desiring person transmits a purchase desire notification to an owner, the owner permits the purchase, and thereafter a planned owner changes the owner. This is for matching a current NFT transaction. Here, the order is not limited to this order, and the owner may change the owner of the owner management information. In such a case, there is no owner updating process in FIGS. 4 and 10, and the owner updating process is performed in each of Steps S2120 and S3230. In such a case, at the time of referring from the user B, the planned owner management information is referred to, and the lock information and the authentication information area used.

In addition, in each of the embodiments, although an off-chain in which content are present outside the blockchain is assumed, an on chain in which content are present on a blockchain may be used. Furthermore, only a part of a content may be encrypted, or a content may be encrypted after a predetermine period after registration of the content such that a purchaser can purchase a content after checking the content.

In each of the embodiments, although the lock information, the authentication information, and the like are used for transmission and reception of the content key, such information may be used also for access to the content server 300. For example, in a case in which a content user accesses the content server 300, the content server 300 determines access/non-access to the content by referring to at least one of the lock information and the authentication information recorded in the smart contract 102. In a case in which none of both of the lock information and the authentication information has not been registered, the content server 300 may determine access/non-access to the content using the public key used for generation of a blockchain network address. In such a case, in the content server 300, access to content may be limited to the owner.

The embodiment of the present disclosure described above is an example used for describing the present disclosure, and the scope of the present disclosure is not intended to be limited to such embodiments. A person skilled in the part can perform the present disclosure in various forms without departing from the scope of the present disclosure.

What is claimed is:

1. A content protection system managing content that are encrypted in a form that is able to be decrypted using a content decryption key and are stored in a predetermined storage place, the content protection system comprising:
   a blockchain network configured using a plurality of computers; and
   a plurality of connection apparatuses configured to be coupled to the blockchain network,
   wherein a first connection apparatus that is one of the plurality of connection apparatuses stores the content decryption key, receives a use request requesting use of the content and including a public key corresponding to a secret key managed by a second connection apparatus from the second connection apparatus that is the connection apparatus other than the first connection apparatus via the blockchain network, and transmits an encrypted content decryption key acquired by encrypting the content decryption key using the public key included in the use request to the second connection apparatus via the blockchain network,
   the second connection apparatus stores the secret key, transmits the use request to the first connection apparatus via the blockchain network, transmits user information representing a use right grantee to whom a right to use the content is granted to the blockchain network, receives the encrypted content decryption key from the first connection apparatus via the blockchain network, and decrypts the encrypted content decryption key using the secret key to acquire the content decryption key, and
   the blockchain network stores user management information representing usable persons who are able to use the content and adds the use right grantee represented by the user information to the usable persons represented in the user management information in a case in which the encrypted content decryption key is received,
   wherein the second connection apparatus transmits the use request including a hash value of predetermined locking information and transmits the locking information to the blockchain network in a case in which a change possible notification indicating that a usable person is able to be added is received from the blockchain network, and the blockchain network stores the hash value included in the user request as lock information, transmits the change possible notification to the second connection apparatus in a case in which the encrypted content decryption key is received, receives the locking information, adds the use right grantee to the usable persons in a case in which the hash value of the locking information and the lock information coincide with each other, and transmits the encrypted content decryption key to the second connection apparatus.

2. The content protection system according to claim 1, wherein, in a case in which the change possible notification is received, the second connection apparatus transmits authentication information acquired by encrypting referable information that is able to be referred to in the blockchain network using the secret key to the blockchain network, and the blockchain network receives the authentication information and, in a case in which information acquired by decrypting the authentication information using the public key included in the use request coincides with the referable information, adds the use right grantee to the usable persons, and transmits the encrypted content decryption key to the second connection apparatus.

3. The content protection system according to claim 1, wherein the user information represents a blockchain network address of the second connection apparatus that has transmitted the user information, and the second connection apparatus that has transmitted the use request and the second connection apparatus that has transmitted the user information are different from each other.

4. The content protection system according to claim 1, wherein the blockchain network, by deleting an owner who is a user corresponding to the first connection apparatus from the usable persons represented in the user management information, transfers the content from the owner to the use right grantee.

5. The content protection system according to claim 1, wherein the blockchain network stores the hash value of the content.

6. The content protection system according to claim 1, wherein a storage place of the content is a storage apparatus installed outside the blockchain network.

7. A content protection system managing content that are encrypted in a form that is able to be decrypted using a content decryption key and are stored in a predetermined storage place, the content protection system comprising:
  a blockchain network configured using a plurality of computers; and
  a plurality of connection apparatuses configured to be coupled to the blockchain network,
  wherein a first connection apparatus that is one of the plurality of connection apparatuses stores a secret key, transmits a use request via the blockchain network, transmits user information representing a use right grantee to whom a right to use the content is granted to the blockchain network, receives an encrypted content decryption key via the blockchain network, and decrypts the encrypted content decryption key using the secret key to acquire a content decryption key, and
  the blockchain network stores user management information representing usable persons who are able to use the content and adds the use right grantee represented by the user information to the usable persons represented in the user management information in a case in which the encrypted content decryption key is received,
  wherein the first connection apparatus transmits the use request including a hash value of predetermined locking information and transmits the locking information to the blockchain network in a case in which a change possible notification indicating that a usable person is able to be added is received from the blockchain network, and
  the blockchain network stores the hash value included in the user request as lock information, transmits the change possible notification to the first connection apparatus in a case in which the encrypted content decryption key is received, receives the locking information, adds the use right grantee to the usable persons in a case in which the hash value of the locking information and the lock information coincide with each other, and transmits the encrypted content decryption key to the first connection apparatus.

8. The content protection system according to claim 7, further comprising a second connection apparatus that is one of the plurality of connection apparatuses,
  wherein the second connection apparatus that is one of the plurality of connection apparatuses stores the content decryption key, receives the use request from the first connection apparatus via the blockchain network requesting use of the content and including a public key corresponding to the secret key managed by the first connection apparatus from the first connection apparatus that is the connection apparatus other than the second connection apparatus via the blockchain network, and transmits the encrypted content decryption key acquired by encrypting the content decryption key using the public key included in the use request to the first connection apparatus via the blockchain network.

9. The content protection system according to claim 8, wherein the blockchain network, by deleting an owner who is a user corresponding to the second connection apparatus from the usable persons represented in the user management information, transfers the content from the owner to the use right grantee.

10. The content protection system according to claim 7, wherein, in a case in which the change possible notification is received, the first connection apparatus transmits authentication information acquired by encrypting referable information that is able to be referred to in the blockchain network using the secret key to the blockchain network, and the blockchain network receives the authentication information and, in a case in which information acquired by decrypting the authentication information using the public key included in the use request coincides with the referable information, adds the use right grantee to the usable persons, and transmits the encrypted content decryption key to the first connection apparatus.

11. The content protection system according to claim 7, wherein the user information represents a blockchain network address of the first connection apparatus that has transmitted the user information, and the first connection apparatus that has transmitted the use request and the first connection apparatus that has transmitted the user information are different from each other.

12. The content protection system according to claim 7, wherein the blockchain network stores the hash value of the content.

13. The content protection system according to claim 7, wherein a storage place of the content is a storage apparatus installed outside the blockchain network.

* * * * *